United States Patent
Thielen et al.

(12) 
(10) Patent No.: US 6,331,586 B1
(45) Date of Patent: Dec. 18, 2001

(54) CONDUCTIVE POLYMER BLENDS WITH FINELY DIVIDED CONDUCTIVE MATERIAL SELECTIVELY LOCALIZED IN CONTINUOUS POLYMER PHASE OR CONTINUOUS INTERFACE

(75) Inventors: Alain Thielen, Thimister; Baudouin Valange, Trooz, both of (BE); Stefan Viering, Aachen (DE)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/248,277

(22) Filed: Feb. 11, 1999

Related U.S. Application Data
(60) Provisional application No. 60/074,483, filed on Feb. 12, 1998.

(51) Int. Cl.⁷ .............................. C08K 3/00; C08L 83/00; C08L 31/04
(52) U.S. Cl. .......................... 524/401; 524/430; 524/507; 524/525; 524/528
(58) Field of Search .................................. 524/507, 528, 524/525, 430, 401

(56) References Cited

U.S. PATENT DOCUMENTS

| | | | |
|---|---|---|---|
| 4,265,789 | 5/1981 | Christopherson et al. | 252/511 |
| 4,642,202 | 2/1987 | Railsback | 252/511 |
| 6,086,792 | 7/2000 | Reid et al. | 252/511 |
| 6,197,219 | 3/2001 | Fougler | 252/500 |

FOREIGN PATENT DOCUMENTS

| | | |
|---|---|---|
| 0 486 307 A2 | 11/1991 | (EP) . |
| 0 971 366 A1 | 1/2000 | (EP) .................. H01B/1/20 |
| 0 971 368 A1 | 1/2000 | (EP) .................. H01B/1/22 |
| 94-206730 | 5/1994 | (JP) . |

OTHER PUBLICATIONS

Thesis from the Universite De Liege, Faculte des Sciences Etude de Melanges Composites Polymeres Conducteurs de l'Electricite a Base de Noir de Carbone pp. 1–203. (1995–1996).

International Search Report for PCT/US99/02882, mailed Jun. 22, 1999.

*Primary Examiner*—Peter D. Mulcahy (57) ABSTRACT

A conductive polymer blend comprising:
(a) at least two polymers which are at least partially immiscible with each other, and are present in proportions such that each polymer forms a respective continuous phase and the two respective continuous polymer phases are co-continuous with each other in the polymer blend; and
(b) at least one conductive material in particulate or fiber form which is substantially localized in one of said co-continuous polymer phases or substantially localized at a continuous interface between said co-continuous polymer phases. Optionally, the polymer blend may contain a mineral filler and/or a thixotropic thickening agent.

27 Claims, 2 Drawing Sheets

CONDUCTIVE POLYMER BLENDS WITH FINELY DIVIDED CONDUCTIVE MATERIAL SELECTIVELY LOCALIZED IN CONTINUOUS POLYMER PHASE OR CONTINUOUS INTERFACE

This application is a continuation-in-part of prior provisional application Ser. No. 60/074,483 filed Feb. 12, 1998, which is incorporated in its entirety by reference herein.

BACKGROUND OF THE INVENTION

This invention relates to a polymeric material which is a conductive blend of at least two polymers and contains at least one finely divided conductive material. The invention also relates to methods for preparing the conductive blends of polymers, and their use.

Polymers in general are insulating materials. For certain applications it is desirable for a polymeric material to have some degree of electrical conductivity, for example in "ESD" or electrostatic dissipative applications such as antistatic packaging, housing for electronic equipment, containers and pipelines for flammable liquids and gases, or in charge-transporting components for electrographic imaging equipment.

The addition of finely divided conductive material such as a conductive carbon black is often used for achieving the desired conductivity in a polymer or polymer blend. The conductive carbon black is dispersed in the insulating polymer matrix. As the amount of dispersed particles of carbon black is increased and reaches the "percolation threshold" concentration, the particles come sufficiently into contact with each other so that a marked increase in conductivity is observed for the carbon black-loaded polymer. The desired conductivity is obtained by controlling the loading of the conductive particles such as carbon black. However, as the concentration of carbon black increases, the mechanical properties of the composite tend to deteriorate. The toughness and flexibility of the composite decrease, and an article formed from the carbon filled material is undesirably brittle.

In order to recover good impact strength and flexibility in thermoplastic polymers containing carbon black, a common method incorporates impact modifiers such as rubber particles, core/shell acrylic copolymers, thermoplastic elastomers, or other reinforcing agents into the thermoplastic composition. These additives increase process complexity and generally cause other side effects such as rheological modification or dispersion problems.

Another important detrimental effect of the presence of carbon black in plastics is the reduction of the melt fluidity of the thermoplastic polymers, which affects the ease of processability at the transformer level (at the injection molder, extruder, blow molder, thermoforming, etc.). A melt viscosity which is too high can lead to a reduction of output rates, higher energy consumption, increases in melt pressure and melt temperature, mold filling problems, and polymer degradation.

In view of the above mentioned detrimental effects of the incorporation of carbon black, it is desirable to reduce the amount of carbon black in the polymer composition to improves its global product property profile. For that reason, the carbon blacks used are generally superconductive ones such as KETJENBLACK EC 600 JD™ (AKZO) or PRINTEX XE2™ (DEGUSSA) in order to obtain electrical percolation at the minimum carbon black loading. It is, however, generally difficult, if not impossible, to obtain electrical conductivity for compositions containing, for example, less than 5% KETJENBLACK EC 600 JD™, which is a highly conductive carbon black.

Furthermore, although superconductive carbon blacks are generally preferred to others due to the lower loading necessary to obtain a percolation path, they present the worst structural characteristics that can be envisioned with regards to the problems described above. They are characterized by a high degree of structure (high DBPA) and small primary particles (high surface area). As a consequence, first, it is generally difficult to obtain good dispersion of these carbon blacks in the composition (dispersion being difficult for carbon black of small primary particle size), which results in deficiencies in mechanical properties, and, second, the viscosity of the obtained composition is high because of the combination of a high degree of structure and a small primary particle size. Consequently, even by using superconductive carbon black, it is not possible to reduce the level of carbon black sufficiently to overcome the problems described above.

More recently, another approach in reducing the carbon black loading necessary for imparting conductivity to a polymer has been investigated with specific blends of immiscible polymers which form two co-continuous phases (i.e., two simultaneously and separately continuous phases) in which the carbon black is localized selectively in a continuous polymeric phase, or at the continuous interface between the two co-continuous polymeric phases. Investigations of the following polymer systems had thus been reported:

HDPE/PS
PS/PMMA
PS/Rubbers (EPR, EPDM, polybutadiene, polyisoprene)
HDPE/ultrahigh molecular weight PE
PP/polyamide
PS/polyisoprene
PP/polycarbonate, wherein  PS = polystyrene
PMMA = polymethyl methacrylate
EPR = ethylene propylene rubber
EPDM = ethylene propylene diene rubber
HDPE = high density polyethylene
PP = polypropylene.

In the above systems, under certain conditions the carbon black was found to be selectively localized in one of the continuous polymeric phases, or at the continuous interface between the co-continuous polymeric phases. As a result of the selective localization, conductivity was attained with a lower carbon black load. In particular, when the carbon black was localized at the continuous interface between the two co-continuous polymeric phases, an even higher conductivity was obtained (i.e., the percolation threshold concentration was greatly reduced) than when the carbon black was localized in a continuous polymer phase. However, the co-continuity of the blend which was required for obtaining this reduction of the percolation threshold concentration for electrical conductivity was not always achieved with all the reported blends.

Although the mechanical properties of the above co-continuous carbon black loaded-polymer blends are less impaired because the carbon black loading is less than in a single phase polymer matrix, the blending of two such polymers which are not fully miscible and not fully compatible nevertheless results in poorer mechanical properties of the blends, as compared to the mechanical properties of the polymer component in the blend which has the most desirable mechanical properties when used by itself (i.e., as a single phase, one-polymer composition). The reason is that there is poor interfacial adhesion at the phase boundary between the two polymers, which presents weak points at which fractures can find easy propagation paths.

SUMMARY OF THE INVENTION

An object of the invention is to provide conductive polymer blends characterized by at least two co-continuous polymer phases constituted by two polymers which are at least partially immiscible with each other, in which the amount of finely divided conductive material necessary to obtain electrical conductivity is lowered by causing the finely divided conductive material to localize substantially in a selective manner in a continuous polymer phase in the blend, or at the continuous interface between the co-continuous polymer phases, without significant deterioration of the mechanical properties of the polymer blends.

Another object of the invention is to provide conductive polymer blends which may be colored to any color.

Another object of the invention is to provide a conductive polymer blend which is suitable for processing by any method, including blow molding.

Yet another object of the invention is to provide a method for preparing conductive polymer blends characterized by at least two co-continuous polymer phases constituted by two polymers which are at least partially immiscible with each other, wherein a finely divided conductive material is substantially localized in a selective manner in a continuous polymer phase or at the continuous interface between two co-continuous polymer phases, and the conductive polymer blends have improved mechanical properties.

Another object of the invention is to provide articles formed from the co-continuous conductive polymer blends.

DETAILED DESCRIPTION OF THE INVENTION

The present invention relates to polymer compositions which contain a finely divided conductive material, such as carbon black and/or other carbon products, in a lower amount than conventionally used to obtain acceptable electrical conductivity. By reducing the amount of conductive material needed to obtain acceptable electrical conductivity, other advantages can also be gained, including the reduction or elimination of impact modifiers which are generally needed when large amounts of carbon black are used, substantially maintaining the melt viscosity of the polymeric composition which existed prior to the introduction of the finely divided conductive materials, and minimizing the carbon black sloughing and rub off effect from a product made with the composition. In specific polymer/carbon black combinations, the selective localization of the carbon black allows the obtention of very low percolation thresholds; far lower than those observed with classical polymer systems filled with carbon black, even when using carbon blacks which are not particularly designed for conductive applications (i.e., carbon blacks having a larger particle size, and less structure development).

Carbon blacks or other carbon powders or aggregates are preferred as the finely divided conductive material for many applications of the conductive polymer blend of the invention. While the preferred carbon product is carbon black, any carbon product can be used that is compatible with polymeric compositions. The carbon product may be of the crystalline or amorphous type. Examples include, but are not limited to, graphite, carbon black, vitreous carbon, activated charcoal, activated carbon, carbon fibers, and mixtures thereof. Mixtures or combinations of any of the carbon products can be used as well.

The following grades are examples of carbon black suitable for use in the conductive polymer blend of the invention:

KETJENBLACK EC600JD™ (AKZO)
KETJENBLACK EC300™ (AKZO)
PRINTEX XE2™ (DEGUSSA)
VULCAN P™ (CABOT CORPORATION)
VULCAN XC-72™ (CABOT CORPORATION)
UNITED 120™ (CABOT CORPORATION)
BLACK PEARLS 1000™ (CABOT CORPORATION)
ENSACO 250™ (MMM CARBON)
ENSACO 350™ (MMM CARBON)
DENKA BLACK™ (DENKA)

The finely divided conductive material may be other conductive powders, fibers, aggregates or composite particles such as steel fibers, metal powders or flakes (e.g., silver or aluminum flakes), organic semiconductor powders, metal-coated fibers (e.g., nickel-coated fibers), conductive metal oxide particles (e.g., $SnO_2$), inorganic particles coated with a conductive layer (e.g., metal oxide particles such as $TiO_2$ coated with $Sb_2O_5$-doped $SnO_2$), etc. There is no particular limitation on the finely divided conductive material, provided that it does not react chemically with the components of the polymer blend, and can be dispersed in a polymer phase in the blend, or be dispersed at the interface between polymer phases in the blend. When the finely divided conductive material is dispersed in a polymer phase, it is preferable that the size of the conductive material be no greater than the size of the phase of that polymer. At least, the particle size of the conductive material should not be substantially larger than the size of the phase of polymer in which the conductive material is dispersed. In general, the particle size of the conductive material is selected to be of a suitable size not greater than about 20 $\mu$m, preferably not greater than about 12 $\mu$m, more preferably not greater than about 8 $\mu$m, and even more preferably not greater than about 6 $\mu$m.

The finely divided conductive material is selected from materials other than carbon black for applications requiring the polymer blend to be colored to a color other than black. In general, the color of these other finely divided conductive materials varies, in particular from different shades of gray to white. Finely divided conductive material which is light in color, such as particles of $TiO_2$ coated with $Sb_2O_5$-doped $SnO_2$, which are white, are suitable for preparing light-colored blends. In the case of $TiO_2$ coated with $Sb_2O_5$-doped $SnO_2$ it is particularly preferred that such conductive material be in the form of acicular particles.

In combination with or in lieu of conventional carbon products, modified carbon products can be used. For purposes of the present invention, a modified carbon product includes an aggregate comprising a carbon phase and a silicon-containing species phase. A description of this aggregate as well as means of making this aggregate are described in PCT Publication Nos. WO 96/37547 and WO 98/13418, U.S. Pat. Nos. 5,747,562; 5,622,557; and 5,830,930; as well as U.S. patent application Nos. 08/528,895, now abandoned; and 08/750,017, now U.S. Pat. No. 6,028,137. All of these patents, publications, and patent applications are hereby incorporated in their entireties herein by reference.

The modified carbon product, for purposes of the present invention, can also be an aggregate comprising a carbon phase and metal-containing species phase where the metal-containing species phase can contain a variety of different metals such as magnesium, calcium, titanium, vanadium, cobalt, nickel, zirconium, tin, antimony, chromium, neodymium, lead, tellurium, barium, cesium, iron, molybdenum, aluminum, and zinc, and mixtures thereof. The aggregate comprising the carbon phase and a metal-containing species phase is described in U.S. patent application No. 08/828,785 filed Mar. 27, 1997, now U.S. Pat. No. 6,017,980 and PCT Publication No. WO 98/42778 also hereby incorporated in its entirety herein by reference.

Also, for purposes of the present invention, a modified carbon product includes a silica-coated carbon black, such as that described in PCT Publication Nos. WO 96/37547, and WO 98/13428, also incorporated in their entireties herein by reference.

The modified carbon product can also be a carbon product or colored pigment having attached at least one organic group which can include a monomeric group, oligomeric group or polymeric group. The organic group can be an aromatic group or an alkyl group. Examples include those set forth in U.S. Pat. Nos. 5,672,198; 5,554,739; 5,571,311; 5,630,868; 5,707,432; 5,803,959; 5,698,016; 5,713,988; and 5,851,280; and PCT Publication Nos. WO 96/18688; WO 97/47697; and WO 97/47699, all incorporated in their entireties by reference herein.

Furthermore, the modified carbon product can be a carbon product having attached at least a stable free radical. Examples include those described in U.S. patent application Nos. 08/962,244, now abandoned; 08/968,299, now U.S. Pat. No. 6,068,688; and 09/181,926, all incorporated in their entireties herein by reference.

The polymeric group can be any polymeric group capable of being attached to a carbon product. The polymeric group can be a polyolefin group, a polystyrenic group, a polyacrylate group, a polyamide group, a polyester group, or mixtures thereof. Monomeric groups are monomeric versions of the polymeric groups.

The organic group can also be an olefin group, a styrenic group, an acrylate group, an amide group, an ester, or mixtures thereof. The organic group can also be an aromatic group or an alkyl group, either group with an olefin group, a styrenic group, an acrylate group, an amide group, an ester group, or mixtures thereof, wherein preferably the aromatic group, or the alkyl group, like a $C_1$–$C_{12}$ group, is directly attached to the carbon product.

The polymeric group can include an aromatic group or an alkyl group, like a $C_1$–$C_{12}$ group, either group with a polyolefin group, a polystyrenic group, a polyacrylate group, a polyamide group, a polyester group, or mixtures thereof.

The organic group can also comprise an aralkyl group or alkylaryl group, which is preferably directly attached to the carbon product. Other examples of organic groups include a $C_1$–$C_{100}$ alkyl group.

The polymer blend is any composition having at least two co-continuous polymer phases, in which the finely divided conductive material can be dispersed in one polymer phase or at the interface between the two co-continuous polymer phases. Polymeric compositions as used in the present invention include thermoplastic polymers and crosslinkable polymers or mixtures thereof. Preferably, the polymeric composition contains at least one thermoplastic polymer. The crosslinkable polymer usable in the conductive blend of the invention includes rubbers and other crosslinkable polymers or polymer blends.

The polymers in the conductive blend of the invention can be homopolymers, copolymers, terpolymers, and/or polymers containing any number of different repeating units. Further, the polymer can be any type of polymer, such as a random polymer, alternating polymer, grafted polymer, block polymer, star-like polymer and/or comb-like polymer. The polymer can have the structure of an interpenetrating polymer network, simultaneous interpenetrating polymer network, or interpenetrating elastomeric network.

Specific examples of polymers include, but are not limited to, linear high molecular weight polymers such as polyethylene, poly(vinylchloride), polyisobutylene, polystyrene, polycaprolactam (nylon), polyisoprene, and the like. Other general classes of polymers include polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), fluoropolymers, ionomeric polymers, polymers containing ketone group(s), liquid crystal polymers, polyamide-imides, polymers containing olefinic double bond(s) (such as polybutadiene, polydicyclopentadiene), polyolefin copolymers, polyphenylene oxides, polyurethanes, thermoplastic elastomers and the like.

Generally, the polymers described in Volume 18 of the Encyclopedia of Chemical Technology, KIRK-OTHMER, (1982), page 328 to page 887, and Modern Plastics Encyclopedia '98, pages B-3 to B-210, both incorporated in their entirety herein by reference, can be used as the polymers in the present invention.

The polymers of the present invention can be prepared in a number of ways and such ways are known to those skilled in the art. The above referenced KIRK-OTHMER section and Modern Plastics Encyclopedia provide methods by which these polymers can be prepared.

In general, any pair of polymers may be selected for a blend provided that the two polymers present at least some degree of immiscibility and preferably differ in their polarity. Examples of pairs of polymers suitable for use in this invention are:

|  |  |  |
|---|---|---|
|  | - HDPE/TPU | - PP/EPDM |
|  | - HDPE/EPR | - PP/EPR |
|  | - HDPE/EPDM | - PP/mLLDPE |
|  | - HDPE/mLLDPE | - mLLDPE/EPR, |
| wherein | HDPE: | high density polyethylene |
|  | TPU: | thermoplastic urethane |
|  | EPR: | ethylene propylene rubber |
|  | EPDM: | ethylene propylene diene rubber |
|  | mLLDPE: | metallocene catalyzed linear low density polyethylene |
|  | PP: | polypropylene. |

The above pairs of polymers are particularly suitable for use with the specific grades of carbon black listed above.

The present invention makes it possible to use a smaller amount of the finely divided conductive material in a polymeric composition and yet obtain substantially the same, if not the same, electrical conductivity as in the individual polymers loaded with the same finely divided conductive material. In other words, in the present invention substantially the same resistivity, if not the same, is achieved with a lower amount of carbon black than is normally required for achieving the same resistivity in the individual polymers. This result is accomplished by using blends of polymers having such characteristics that at least two co-continuous polymer phases exist in the blend, and the finely divided conductive material becomes substantially localized in a selective manner in one of the co-continuous phases, or at the continuous interface between two co-continuous polymer phases. At the same time, the conductive polymer blend of the invention has acceptable mechanical properties, notwithstanding the presence of the co-continuous, immiscible polymer phases. The present invention thus avoids poor internal adhesion, and consequently poor mechanical properties of the polymer blend.

The polymer blend of the invention contains at least two polymers which are immiscible, or at least partially immiscible, with each other. The blend may contain other polymers in addition to the two polymers which are at least partially immiscible with each other. The additional polymer(s) does not have to be immiscible with any of the other polymers in the blend. In other words, the additional polymer(s) may be integrated into the continuous phase of another polymer in the blend, or even be integrated simultaneously into two or more separate continuous phases formed respectively by two or more other polymers. Alternatively, the additional polymer(s) may be immiscible with all other polymers in the blend, in which case the additional polymer(s) may form its own continuous phase or be dispersed inside the continuous phase formed by another polymer in the blend.

Blends of immiscible polymers are characterized either by morphologies wherein one of the polymers constitutes a dispersed phase in a second polymer which is continuous, or by morphologies where both polymer phases are co-continuous. In the latter case, the interface between both polymer phases is also continuous in the material. The conductive polymer blends of the invention contain at least two co-continuous polymer phases in which each polymer phase in effect forms a network, and the networks formed by the individual polymer phases co-exist in the blend. The proportions of the polymers constituting the blend are selected so that co-continuity of the polymer phases is obtained. Each pair of polymers is characterized by their co-continuity domain, which may be different from the con-continuity domain of another pair of polymers.

By selecting the nature of the polymers and the finely divided conductive material, based on the specific interfacial interactions between the finely divided conductive material and the polymers, it is possible to localize selectively the finely divided conductive material in a continuous polymeric phase or at the phase boundary, that is, at the interface between two immiscible polymers which are present as two co-existent continuous phases. In the case where the conductive material has a preferred affinity with one of the polymer phases, it will remain in that phase, or even migrate to that phase if the viscosity of the polymer blend permits it and there is no other impairment to the mobility of the conductive material. In the case where the conductive material has no particular affinity with any of the polymers, it will tend to migrate to the interface in order to minimize the interfacial area with both polymers. This situation will occur when the interfacial tension of the conductive material is equally high with respect to the various polymers of the blend. The interfacial tension between two materials, such as between the conductive material and a polymer, is calculated from the surface tension of the two materials. This surface tension is composed of a dispersive component and a polar component. In the conductive blend of the invention, the polar component of the conductive material, which is linked to its surface polarity, plays an important role in the localization of the conductive material. That is, the polarity of the conductive material, which relates to its surface oxidation and can be measured by its pH, are important criteria in the determination of the type of interaction between the conductive material and a polymer. For example, in the HDPE/TPU system, a carbon black with a pH which is neutral or above 8 becomes essentially localized at the interface because it has no particular affinity for any of the polymer phases. On the other hand, a carbon black having a low pH, namely a carbon black which is highly polar/oxidized, presents some affinity with TPU and becomes localized in the TPU phase. In general, by selecting the type of carbon product or pigment (for example, selecting the type of modifying organic group attached to the carbon product or pigment), it is possible to control the localization of the carbon product or pigment in the co-continuous polymer blend.

To provide conductivity in the polymer blend, the aim is to build a percolation path of the finely divided conductive material in the material, either in the bulk of one continuous polymer phase or at the interface between two polymer phases. As a result, electrical conductivity is obtained at a loading of the finely divided conductive material which is lower than the loading required for obtaining conductivity in a single-phase polymer or polymer blend. This lower loading required for obtaining the electrical percolation should preserve the mechanical properties of the polymers, which are generally negatively affected by the presence of finely divided conductive material. It is preferred that the finely divided conductive material be present in a sufficient amount, which is at least equal to the percolation threshold concentration for one or both of the polymer phases. However, the loading of the finely divided conductive material should not be excessively higher than the percolation threshold when stringent control on the mechanical properties of a product formed from the blend is necessary.

The conductive polymer blend of the invention may contain a mineral filler. Examples of mineral fillers are inorganic compounds such as carbonates, silicates, aluminosilicates, oxides, hydroxides, sulfates or sulfides. Specific examples of a mineral filler are calcium carbonate, talc, or precipitated silica. The particle size of the mineral filler is not particularly limited, except that the particle size is selected in view of the desired mechanical strength. In general, it is preferred that the particle size of the mineral filler be not greater than a "top cut" of about 50 $\mu$m, the top cut being the average particle size in 98% of the particles. More preferably, the top cut of the mineral filler is not greater than about 40 $\mu$m. The mineral filler may have a particle size in the same range as the finely divided conductive material, or may be bigger than the finely divided conductive material. When the particles of mineral filler are large, it is believed that they may provide bridges between the different polymer phases and thus reduce the tendency for the two immiscible, non-compatible polymers to develop fractures at their boundaries. On the other hand, the mineral filler may have a particle size characterized by a top cut of no more than about 1 $\mu$m. For example, various $CaCO_3$ having a top cut of about 2 $\mu$m, about 6 $\mu$m, or about 12 $\mu$m can be used in the conductive polymer blend of the invention. The mineral filler may be of any kind of particular shape, including granular, spherical, laminar, flake-shaped, irregular and sharp, irregular and smooth, or acicular forms. The amount of the mineral filler is selected depending upon the desired balance between mechanical strength and conductivity of the blend. In general, a mineral filler helps to improve mechanical strength, but may impair conductivity if used in large amounts. Conductive polymer blends having an acceptable balance of properties have been obtained with up to about 10 wt. % of mineral filler. In some instances, an even larger amount of up to about 15 wt. %, and even about 20 wt. %, of mineral filler may be used. A limiting factor, however, is that the mineral filler should not be present in excess of the amount of the polymer phase in which the mineral filler is distributed.

In addition to the polymers and the finely divided conductive material, the polymer blend of the invention may also contain an additive which functions as a thixotropic thickener in a non-polar fluid. Examples of the thixotropic thickener are finely divided silica known as "colloidal silica" or fumed silica, finely divided alumina or bentonite, or mixtures thereof. The thixotropic thickeners, such as fumed silica, are distinguished from the mineral fillers described above, such as precipitated silica, by their thixotropic effect on the melted polymer blend. Fumed silica is a preferred thixotropic thickener for HDPE/TPU co-continuous blends. In general, the amount of thixotropic thickener is less than the amount of mineral filler used in the conductive polymer blend according to the invention. The amount of thixotropic thickener is selected to obtain the desired rheology of the melted polymer blend according to the invention. In many instances, a suitable amount of the thixotropic thickener is less than about 10 wt. %, more preferably less than about 5 wt. %, and even more preferably less than about 2 wt. %.

The products made from the polymer blends of the invention are characterized by a combination of strong mechanical properties with enhanced electrical conductivity at a lower loading of the conductive material, which is a combination not heretofore achieved. In particular, the mechanical properties are fine-tuned by appropriate selection of the constituent polymers, the finely divided conductive material, the addition of mineral fillers or thixotropic thickeners, as well as by the appropriate selection of the proportions of the constituent polymers, the method of blending the components of the polymer blend, the method of formation of the polymer blend into a product, including the duration of annealing treatment. The following factors are taken into consideration in preparing a conductive polymer blend according to the present invention:

Improved mechanical properties are achieved by selecting polymers for blending which have similar physical properties so that delamination of products prepared from the blend can be minimized. It is acceptable that the polymers in the blend be only partially immiscible. In other words, the two polymers may be partially miscible, provided that the degree of miscibility does not destroy the co-continuous blend morphology.

Within the co-continuity domain in a polymer blend, a ratio of the two immiscible polymers is selected so that the polymer which has the more desirable mechanical properties is present is a major amount, as compared to the other polymer.

Two or more polymers which are miscible may be blended with each other homogeneously to form a single phase having the desired physical properties. For example, two polymers of different flexibilities may be blended to obtain a blend having an intermediate flexibility.

In general, the addition of a mineral filler helps to improve mechanical strength of a product prepared from the polymer blend.

For applications which require a smooth, flexible but strong polymer melt, such as in blow molding applications, an additive which functions as a thixotropic thickener in a non-polar fluid may be added to improve the rheology of the polymer melt.

For applications requiring improved mechanical strength, annealing a formed product generally results in improvement in the mechanical strength, and may also improve the conductivity in the case where the finely divided conductive material and/or the mineral filler is in the form of elongated particles such as acicular particles, or in the form of fibers.

The amount of shear stress applied to the material during the mixing stage is carefully controlled in order to master the blend morphology, which in turn determines the electrical and mechanical properties of the composition. In general, a higher shear stress causes a reduction in the size of each polymer phase. As the shear stress is increased, the size of the phase of the polymer which is present in a minority amount will decrease to the point where the minority polymer is no longer in a continuous phase, but becomes dispersed within the phase of the polymer which is present in a greater amount, and the polymer blend loses its co-continuous character.

The finely divided conductive material used to impart conductivity to the composition is selected on the basis of its affinity/lack of affinity with one or several polymer components of the blend, in order to achieve accordingly a selective localization of this conductive material in the blend.

By appropriate selection of the type of finely divided conductive material and its amount, the natures of the polymers constituting the respective co-continuous phases and their relative proportions, the nature of the polymer blended into one of the co-continuous phases (in the event a blend of polymers is used in that same phase in lieu of a single polymer for the purpose of controlling the properties of that phase as well as the properties of the overall blend), the nature and amount of the optional mineral filler; the nature and amount of the optional thixotropic thickening agent; the thermoforming conditions, etc., as described above, a conductive polymer blend may be obtained which retains at least about 60%, preferably at least about 70%, and more preferably at least about 80%, of the resilience (as measured by the Izod impact strength, for example) of the polymer in the blend which has the highest resilience compared to the other polymers in the blend if each polymer were used as a single-phase polymer system. Similarly, it is possible to obtain a conductive polymer blend of the invention which retains at least about 65%, preferably at least about 75%, and more preferably at least about 85%, of the tensile strength at break of the polymer in the blend which has the highest tensile strength at break, as compared to the other polymers in the blend if each polymer were used as a single-phase polymer system.

Also similarly, the conductive polymer blend of the invention may be made to have at least about 65%, preferably at least about 75%, and more preferably at least about 85%, of the tensile modulus of the polymer in the blend which has the highest tensile modulus, as compared to the other polymers in the blend if each polymer were used as a single-phase polymer system. The conductive polymer blend of the invention can also be prepared to have at least about 65%, preferably at least about 75%, and more preferably at least about 85%, of the elongation at break of the polymer in the blend which has the highest elongation at break, as compared to the other polymers in the blend if each polymer were used as a single-phase polymer system.

The conductive polymer blends of the invention can be compounded by using common mixing equipment such as two-rotor mixers, co-kneaders, twin-screw kneaders, Farrell continuous mixers (FCM), long continuous mixers with axial discharge (LCM-AX), and the like. In general, the finely divided conductive material may be introduced directly into the polymer blend, or the finely divided conductive material may be introduced into one of the polymers before that polymer is blended with another polymer. In the case where a crosslinkable polymer or polymer blend is used for one of the continuous phases in the polymer, a crosslinking agent may be added to the crosslinkable polymer or polymer blend before compounding with the other components of the polymer blend of the invention. The crosslinking agent is not particularly limited, and can be any crosslinking agent specific to the polymer or polymer blend to be croslinked. For example, a crosslinking agent for rubber phases such as EPR and EPDM can be a sulfur-based curing agent or a peroxide-based curing agent. For an example of a non-rubber such as LDPE, organic peroxides are examples of suitable crosslinking agents.

The conductive polymer blends of the invention are suitable for forming into any product by any method, including injection molding, compression molding, extrusion molding from a sheet, film formation and blow molding.

A wide variety of articles may be produced from the polymer blends of the invention, of which the following are non-limiting examples: containers such as bottles, jerrycans, cartons, crates, boxes; packaging; partitions; liners; pipes; pipelines; rods; tools or components thereof; components for electronic equipment, including housing and other parts such as charge transporting components in electrographic imaging equipment.

Amongst others, very remarkable results that were observed with the conductive polymer blends of the invention are:

Volume resistivities around $10^3$ ohm.cm and around $10^5$ ohm.cm were obtained with 1 wt % KETJENBLACK KEC600 JD™ and 1 wt % PRINTEX XE2™, respectively, in HDPE/TPU systems ranging in composition from 70/30 to 10/90. It should be noted that, in general, more than 5 wt % KETJENBLACK KEC600 JD™ is necessary to obtain such a level of conductivity in a single phase-polymer or polymer blend.

In the 50/50 HDPE/TPU system, the percolation threshold has been found to be around 0.35 wt % KETJENBLACK KEC600 JD™, which is an extremely low value.

Similarly, 50/50 HDPE/TPU systems have been found to be conductive (resistivity<$5 \cdot 10^4$ ohm.cm) when loaded with about 3 w % VULCAN XC-72™, while more than 15 wt % of this carbon black is usually required to obtain a low resistivity in a corresponding single phase polymer or polymer blend.

Remarkably, UNITED 120™, which is a carbon black characterized by a large particle size and is generally used for utility pigmentation, not being at all designed for conductive application, has been found to impart conductivity (resistivity around $10^5$ ohm.cm) to a 50/50 HDPE/TPU blend when present at only 15 wt %.

In the HDPE/TPU system which has a broad co-continuity range, it is possible to select a blend with a ratio of polymers which gives the desired mechanical properties (flexural, tensile and impact properties) to a product formed from the blend.

PP/mLLDPE blends are particularly suitable for injection molding applications, being characterized by a very high impact strength. The mLLDPE (a metallocene catalyzed polyolefin) is characterized by a narrow molecular weight, combined with a high average molecular weight, which gives a very strong polymer. Therefore, PP/mLLDPE blends have high impact strength even at the levels of conductive material, e.g., carbon black, required for obtaining conductivity, and even when the mLLDPE phase is saturated with carbon black. These PP/mLLDPE blends also present the advantage that various carbon blacks show very clear-cut affinities for one or the other polymer phase, so that it is possible to design blends with the desired properties by selection of the carbon to be localized entirely in only one polymer phase. For example, ELFTEX 254™ (CABOT CORPORATION) localizes entirely in the mLLDPE phase, whereas ELFTEX 460™ (CABOT CORPORATION) localizes entirely in the PP phase. Another advantage of the PP/mLLDPE system is that mLLDPE is available in a broad range of properties depending on its density, from rubber-like to being more like a classical thermoplastic PE. Therefore, an appropriate grade of mLLDPE may be selected for the desired application.

The HDPE/TPU system containing fumed silica as an additive is particularly suitable for blow molding of containers. The properties of the blend in its melted state are very suitable for the blow molding operation. For a polymer blend to be suitable for blow molding, the melted polymer blend must have a sufficiently high viscosity for a self-supporting parison to be obtained, and at the same time, the melted polymer blend must have sufficient elasticity to withstand the blow molding process and expand under blowing into the desired shape. The HDPE/TPU system containing fumed silica has a very favorable high melt strength, and gives a parison having strikingly good form stability. Consequently, it is possible to form products having a long dimension, which is generally not possible in blow-molding operations. Moreover, the obtained product has excellent mechanical properties, so that the blend is suitable for use in making containers which must meet stringent performance standards, for example, containers for gasoline or other flammable liquids.

The following examples further illustrate aspects of the invention but do not limit the invention. Unless otherwise indicated, all parts, percentages, ratios, etc. in the examples and the rest of the specification are by weight.

EXAMPLE 1 PP/EPR BLENDS

50/50 blends of PP (FINAPROP 3660™, FINA Chemicals) and EPR (VISTALON 2504™, EXXON) were mixed in a laboratory scale Brabender mixer (50 cm$^3$ chamber) at 200° C. until melting, before 1 wt. % of the carbon blacks listed below was added and blended for 10 minutes after introduction of the carbon black. Compression molded samples were produced from the Brabender batch and molded at 200° C. for 10 minutes. A microtome was used to prepare thin slices for observation of the morphology of the blend by microscopic (TEM) observation which revealed that all the carbon blacks tested were selectively localized in the EPR (rubber) phase. The blends were co-continuous.

PRINTEX XE2™ (DEGUSSA)
BLACK PEARLS 1000™ (CABOT CORPORATION)
VULCAN XC-72™ (CABOT CORPORATION)
KETJENBLACK EC600JD™ (AKZO)
VULCAN P™ (CABOT CORPORATION)
UNITED 120™ (CABOT CORPORATION)
DENKA BLACK™ (DENKA)

EXAMPLE 2 PP/EPDM BLENDS

50/50 blends of PP (FINAPROP 3660™ from FINA Chemicals) and EPDM (VISTALON 2504™ from EXXON) were prepared in the same manner as in Example 1 with the following carbon blacks:
PRINTEX XE2™ (DEGUSSA)
BLACK PEARL S 1000™ (CABOT CORPORATION).

The carbon blacks were found to be localized in the rubber phase (EPDM), and the blends were co-continuous. The electrical properties were tested for the samples by measuring the resistivity by means of the four-probe method. The results are shown in Table 1.

TABLE 1

| 50/50 PP/EPDM 1 w % carbon black | Volume resistivity (ohm · cm) | Surface Resistivity (ohm/sq) |
|---|---|---|
| PRINTEX XE2 | $8 \times 10^4$ | $2 \times 10^6$ |
| BP1000 | $2 \times 10^{12}$ | $4 \times 10^{13}$ |

Experimental conditions: 1 wt % of carbon black
blending: 10 min. at 200° C.
molding: 10 min. at 200° C.

The resistivities shown in the above table are lower than the resistivities observed with the same loading in a single phase EPDM composition. Thus, it can be seen that when the carbon black is localized in the EPDM phase in the co-continuous PP/EPDM blend, conductivity can be achieved with very low loading of carbon black (1 wt %) compared to the loading required for obtaining conductivity in a composition containing only a single EPDM phase.

EXAMPLE 3 LOCALIZATION OF VARIOUS CARBON BLACKS IN HDPE/TPU

50/50 HDPE/TPU blends were prepared with various carbon blacks in the same manner as in Example 1 except as indicated below. Localization of the carbon black in the samples was observed by TEM. The results are shown in Table 2 which also shows the pH of each carbon black.

TABLE 2

| Carbon black grade | pH | Localization |
|---|---|---|
| BP1000 ™ | 2.5 | TPU |
| BLACK PEARLS L ™ | 2.5 | TPU + little interface |
| REGAL 400 ™ | 2.5 | TPU + interface |
| XC-72 ™ | 6 | Interface |
| KETJENBLACK EC 600 ™ | 7 | Interface |
| XE2 ™ | 7 | Interface |
| DENKA BLACK ™ | 7.6 | HDPE + interface |
| UNITED 120 ™ | 8.0 | Interface |
| VULCAN P ™ | 8.5 | Interface |
| ENSACO 250 ™ | 9.1 | Interface + TPU |

Experimental conditions: 1 wt % of carbon black
blending: 10 min. at 200° C.
molding: 10 min. at 200° C.

It is evident from the above data that carbon black localization depends on the pH of the carbon black. Carbon blacks with a low pH (i.e., more polar carbon blacks) tend to localize in the TPU phase. Carbon blacks with a higher pH tend to localize at the interface, in some instances with some distribution in one of the polymer phases.

EXAMPLE 4 CO-CONTINUITY DOMAINS IN HDPE/TPU BLENDS

Figure 1:
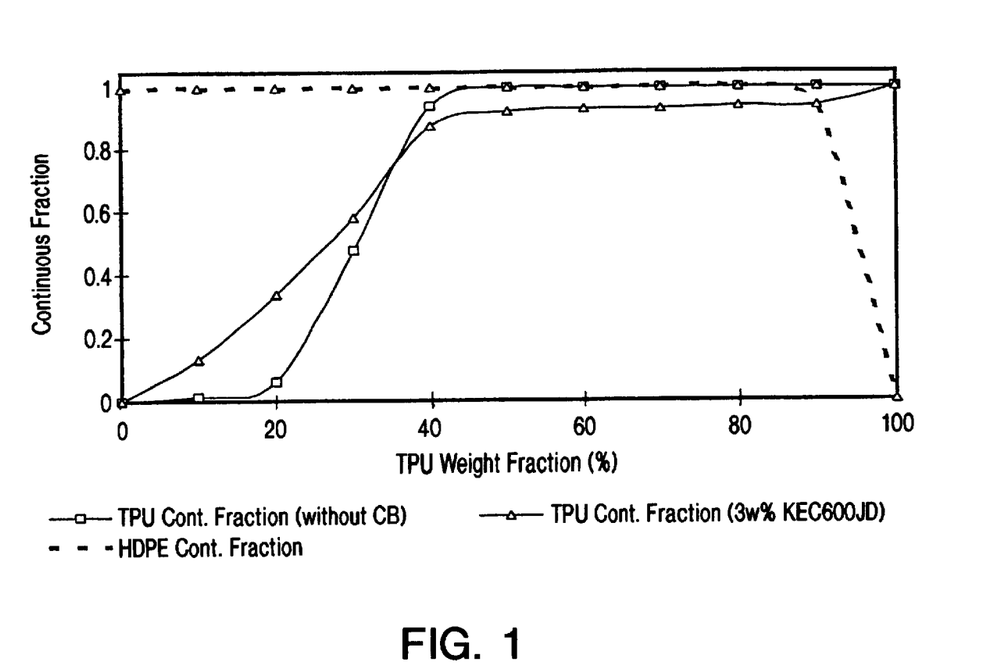
FIG. 1 is a graph showing the co-continuity domain of a polymer blend of the invention.

HDPE/TPU blends were prepared in the same manner as in Example 1, using various HDPE/TPU ratios, with and without KETJENBLACK KEC600 JD™ (3 wt %). The continuous fraction of TPU was evaluated by weight measurement after extraction was conducted on the polymer blends with THF (tetrahydrofuran), which is a selective solvent for TPU. The amount of TPU extracted from the blend represents the fraction of the entire TPU content in the blend which is in a continuous phase and is thus extractable. This "continuous fraction" is a measure of the continuity of the TPU phase. The results are shown in FIG. 1, from which it is evident that the co-continuity domain of the HDPE/TPU system (with or without carbon black loading) extends from 40 to 90 wt % TPU in the blend. Therefore, the HDPE/TPU system is a very versatile system suitable for a wide range of applications requiring that the relative amounts of TPU and HDPE be adjusted to achieve the mechanical properties desired for specific applications.

Figure 2:
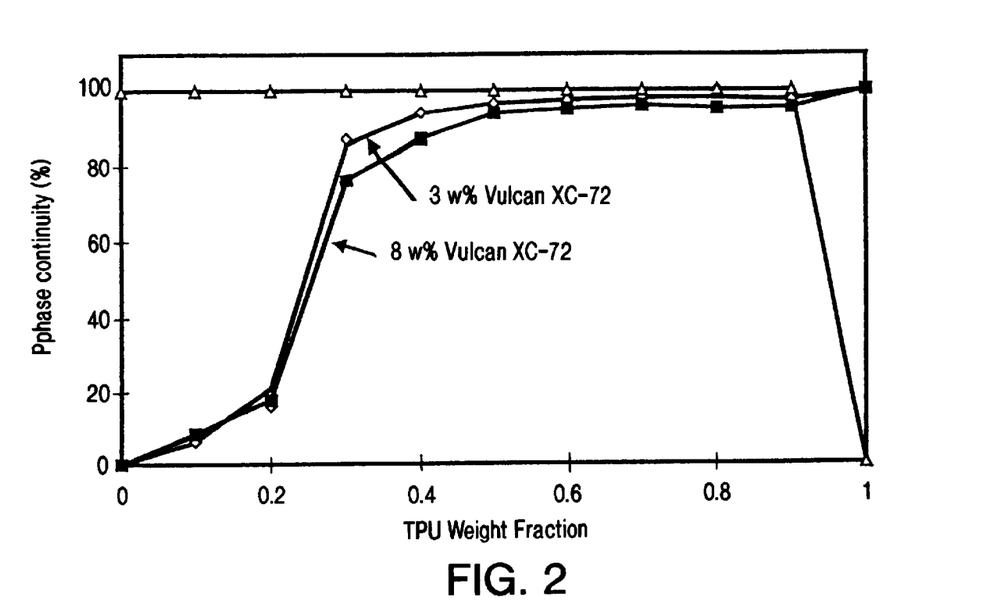
FIG. 2 is a graph showing the co-continuity domain of another polymer blend of the invention.

The co-continuity domain of the HDPE/TPU system was also studied with another carbon black, VULCAN XC-72™, loaded at 3 wt % or 8 wt %. The results are shown in FIG. 2 from which it is evident that the co-continuity domain is similar to that observed with KETJENBLACK KEC600 JD™. However, some variations are noted due to an increase in carbon black loading. As the amount of carbon black is increased, the amount of TPU which could not be extracted by THF increased. On the other hand, for blends having a high content of HDPE (90% and 80%) the continuous fraction of TPU was increased by the carbon black loading.

EXAMPLE 5 ELECTRICAL PROPERTIES OF HDPE/TPU BLENDS

50/50 blends of HDPE and TPU were prepared in the same manner as in Example 1, with 1 wt % of various carbon blacks as shown in Table 3. The volume resistivity and surface resistivity of the samples are also shown in Table 3, from which it is evident that the nature of the carbon black affects the electrical properties of the blend. This observation is contrary to reports in the prior art for other polymer blends that when the carbon black is localized at the interface, the intrinsic properties of the carbon black are not expected to have significant effects on the electrical properties of the blend.

TABLE 3

| 50/50 HDPE/TPU blends filled with 1 wt % of carbon black | Volume resistivity after 1 h molding at 200° C. (Ω · cm) | Surface resistivity after 1 h molding at 200° C. (Ω/sq) |
|---|---|---|
| KETJENBLACK 600 JD ™ (interface) | $4.13 \times 10^3$ | $5.66 \times 10^4$ |
| PRINTEX XE2 ™ (interface) | $8.32 \times 10^4$ | $2.36 \times 10^6$ |
| VULCAN P ™ (interface) | $5.04 \times 10^{10}$ | $5.04 \times 10^{10}$ |
| UNITED 120 ™ (interface) | $8.92 \times 10^{11}$ | $2 \times 10^{14}$ |
| VULCAN XC-72 ™ (interface) | $6.47 \times 10^{11}$ | $6.6 \times 10^{14}$ |
| DENKA BLACK ™ (interface + HDPE) | $1.87 \times 10^{12}$ | $4.5 \times 10^{13}$ |
| BP100 ™ (TPU) | $2.65 \times 10^{12}$ | $4.13 \times 10^{13}$ |

EXAMPLE 6 HDPE/TPU BLENDS WITH CaCO₃ AND CARBON BLACK

Blends of HDPE and TPU were prepared in the same manner as in Example 1, with or without the addition of carbon black and/or $CaCO_3$ as shown in Table 4. The electrical and mechanical properties of samples prepared from the blends are also shown in Table 4.

TABLE 4

|  | Ex 6-1 | Ex. 6-2 | Ex. 6-3 |
|---|---|---|---|
| TPU[1] | 30.00 | 29.00 | 19.00 |
| HDPE[2] | 69.75 | 67.75 | 67.75 |
| $CaCO_3$[3] | 0 | 0 | 10.00 |
| Carbon Black[4] | 0 | 3.00 | 3.00 |
| Antioxidant[5] | 0.25 | 0.25 | 0.25 |
| Average Volume Resistivity[6] ($\Omega \cdot cm$) | 1.00E + 13 | 2.76E + 04 | 3.93E + 04 |
| Average Resilience[7] ($kJ/m^2$) | 1.13 | 1.24 | 2.53 |
| Flexural Behavior[8] | Smooth | Very brittle | Very flexible Hard to break |
| Degree of Delamination[9] | Delamination | No delamination | Slight delamination |

[1]ELASTOLLAN 1174D ™ (BASF - ELASTOGRAN) a polyether TPU, more rigid than other TPUs, but still less rigid than HDPE.
[2]FINATHENE 3802FL POWDER ™ (FINA Chemicals), a HDPE more flexible than other HDPEs but still more rigid than ELASTOLLAN 1174D ™.
[3]OMYACARB OG-2 ™ (OMYA).
[4]KETJENBLACK EC600JD (AKZO).
[5]IRG 1010 (CIBA Specialty Chemicals).
[6]Measured on five compression molded specimens for each formulation (cross-section of 4 × 15 $mm^2$ and length of 25 mm) according to CABOT D007A method. The low resistivities were measured at 5 V and the higher at 500 V with a Keithley 487 picoammeter. Five values of each sample were taken after one minute electrification time. The results are expressed in exponential format (e.g., 1.00E + 13 is the same as $1.00 \times 10^{13}$).
[7]IZOD impact test made on six bars cut from compression molded plaques and notched (dimensions 63.5 × 12.7 × 4 $mm^3$/Norm ISO 180/1A). Before the test the specimens were stored under normal conditions at 23° C. and 50% relative humidity.
[8]Manual evaluation folding test on 2 mm thick pressed plaques (10 × 10 $cm^2$).
[9]Delamination = plaque broke after delamination.

The above results show that $CaCO_3$ is able to replace some TPU without impairing the conductivity of the polymer blend. The volume resistivity of compression molded samples is not affected by $CaCO_3$. However, the volume resistivity of extruded tapes is increased from 1 to 2 orders of magnitude. On the other hand, the presence of $CaCO_3$ is beneficial because of improvements in strength of the blend.

EXAMPLE 7 HDPE/TPU WITH FUMED SILICA AND CARBON BLACK

30/70 TPU/HDPE blends (wherein the TPU portion was made up of 2 parts of rigid polyether PTU and 1 part of rigid polyester TPU and the HDPE was of the rigid type) were prepared with and without the addition of fumed silica as shown in Table 5. Pressed plaques (Dimensions: 10×10 $cm^2$ were formed by pressing at 200° C. and 300 kN after 60 second-annealing. The electrical and mechanical properties of the blends are also shown in Table 5.

TABLE 5

|  | Ex. 7-1 | Ex. 7-2 | Ex. 7-3 |
|---|---|---|---|
| ELASTOLLAN 1174D ™[1] (rigid polyether TPU) | 19.4 | 19.3 | 19.0 |
| ELASTOLLAN C74D ™[1] (rigid polyester TPU) | 9.7 | 9.6 | 9.5 |
| FINATHENE 3802 FL ™[1] (rigid HDPE) | 67.8 | 67.4 | 66.6 |
| KETJENBLACK EC 6000 JD ™[3] | 2.9 | 2.9 | 2.9 |

TABLE 5-continued

|  | Ex. 7-1 | Ex. 7-2 | Ex. 7-3 |
|---|---|---|---|
| CAB-O-SIL M5 ™[4] | -0- | 0.6 | 1.7 |
| IRG. 1010 ™ (antioxidant)[5] | 0.2 | 0.2 | 0.2 |
| Surface Resistivity ($\Omega$/sq)[6] | 19.0E + 3 | 5.4E + 3 | 24.0E + 3 |
| Young's Modulus (MPa)[7] | 404 | 433 | 420 |
| Stress @ yield(Mpa)[8] | 20.3 | 21.4 | 22.3 |
| Folding Test[9] | Flexible | Brittle/Strong | Brittle/Surface breaks |

[1](ELASTOGRAN - BASF).
[2](FINA Chemicals).
[3](AKZO).
[4](CABOT CORPORATION), fumed silica premixed with TPU before blending with HDPE, 4 minutes @ 220° C. for each mixing stage.
[5](CIBA Specialty).
[6]Measured on pressed plaques using two electrodes (25 mm long, 2 mm apart) according to DIN 53482, with two values taken for each sample.
[7]Measured ACCORDING TO ISO R527, Type 2 specimens.
[8]Measured ACCORDING TO ISO R527, Type 2 specimens.
[9]Manual evaluation folding test on 2 mm thick pressed plaques (10 × 10 $cm^2$).

Figure 3:
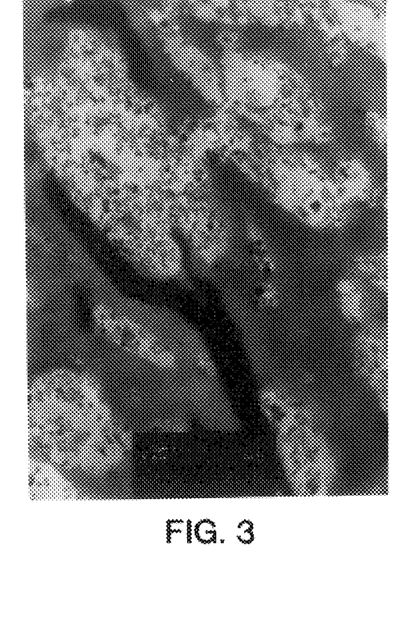
FIG. 3 is a TEM microphotograph of an embodiment of the conductive co-continuous polymer blend of the invention.
Figure 4:
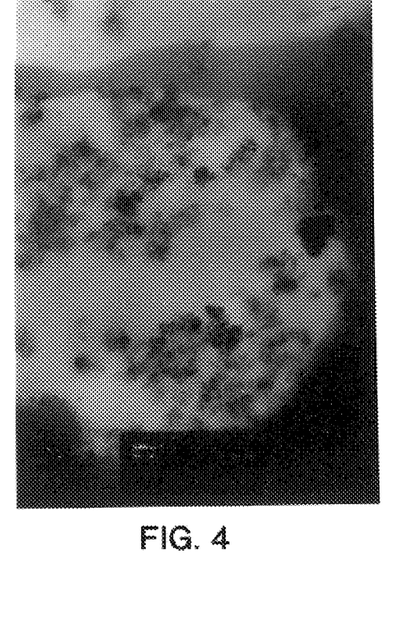
FIG. 4 is a TEM microphotograph at a larger magnification of the embodiment of the conductive co-continuous polymer blend shown in FIG. 3.

The above examples show that the addition of fumed silica in an appropriate amount helps to achieve a balance of tensile and flexural characteristics without affecting to any significant degree the resistivity of the polymer blend of the invention. The 70/30 HDPE/TPU blend having 0.6 wt % fumed silica added thereto (Ex. 7–2) displayed a balance of flexural and tensile behaviors which makes the blend suitable for blow molding into containers. A TEM microphotograph of the blend of Ex. 7–2 is shown in FIG. 3, and also in FIG. 4 at a larger magnification, on the scales indicated in the respective microphotographs. The shaded background in the microphotographs represents the HDPE phase. The lighter areas represent the TPU phase, on which the smaller carbon black particles are clearly visible.

Bottles (0.7 liter) were blow-molded on a KRUPP KAUTEX line (KEB 401, L=50; L/D=20, standard three-zone screw). The process was controlled to give a laminar melt flow. The blow molding operation showed good parison stability, with the polymer blend having 0.6 wt % of fumed silica exhibiting greater stability than the polymer blend having no fumed silica. In comparison, at a mass temperature above 220° C. the melt of the polymer blend having no fumed silica became unstable.

EXAMPLE 8 PE/TPU WITH $TiO_2$ COATED WITH $Sb_2O_5$-DOPED $SnO_2$

PE/TPU blends were prepared in the proportions shown in Table 6 by mixing for 1 minute at low rotor speed in the chamber of a Brabender mixer heated at 180° C. After melting of the polymers, particles of $TiO_2$ covered with a layer of $Sb_2O_5$-doped $SnO_2$ (FT-2000™ from ISHIHARA SANGYO KAISHA) were introduced and mixed for 1 minute, and the rotor speed was then increased to 65 rpm for 8 minutes. Pressed plaques (10×10 $cm^2$ were prepared by pressing at 180° C./50 kN for 10 minutes. The resistivity and the TPU phase continuity were measured. The results are also shown in Table 6.

TABLE 6

|  | Ex. 8-1 | Ex. 8-2 | Ex. 8-3 |
|---|---|---|---|
| mLLDPE[1] | 100 | 90 | 80 |
| TPU[2] | 0 | 10 | 20 |
| FT-2000 (coated $TiO_2$) | 20 | 20 | 20 |

TABLE 6-continued

|  | Ex. 8-1 | Ex. 8-2 | Ex. 8-3 |
|---|---|---|---|
| Volume Resistivity[3] ($\Omega \cdot$ cm) | 8.0E + 12 | 1.3E + 4 | 6.5E + 6 |
| TPU phase continuity[4] (%) | N/A | 100 | 96 |

[1]Metallocene catalyzed LLDPE (EXCEED 109), MFI(190° C./2.16 kg) = 3 g/10 min, EXXON.
[2]ESTANNE 58300 ™ (B F Goodrich), polyether TPU.
[3]Measured on five compression molded specimens for each formulation (cross-section of 4 × 15 mm$^2$ and length of 25 mm) according to CABOT D007A method. The low resistivities were measured at 5 V and the higher at 500 V with a Keithley 487 picoammeter. Five values of each sample were taken after one minute electrification time. The results are expressed in exponential format (e.g., 1.00E + 13 is the same as 1.00 × 10$^{13}$).
[4]Measured by extraction of TPU phase with THF.

The above results show that the addition of TiO$_2$ covered with a layer of Sb$_2$O$_5$-doped SnO$_2$ helped to reduce the resistivity of the PE composition by up to 9 orders of magnitude when 10 parts of TPU were blended with 90 parts of mLLDPE. As the amount of TPU was increased to 20 parts, the TPU phase continuity was decreased and the resistivity increased, even through the resistivity was still about 6 orders of magnitude lower than when no TPU was used in the composition.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A conductive polymer blend comprising:
   (a) at least two polymers which are at least partially immiscible with each other, and are present in proportions such that each polymer forms a respective continuous phase and the two respective continuous polymer phases are co-continuous with each other in the polymer blend; and
   (b) at least one conductive material in particulate or fiber form which is substantially localized in one of said co-continuous polymer phases or substantially localized at a continuous interface between said co-continuous polymer phases, wherein said at least two polymers are a pair selected from the following pairs of polymers:
   HDPE/TPU
   HDPE/EPR
   HDPE/EPDM
   HDPE/mLLDPE
   PP/EPDM
   PP/EPR
   PP/mLLDPE
   mLLDPE/EPR

| wherein | HDPE: | high density polyethylene |
|---|---|---|
|  | TPU: | thermoplastic urethane |
|  | EPR: | ethylene propylene rubber |
|  | EPDM: | ethylene propylene diene rubber |
|  | mLLDPE: | metallocene catalyzed linear low density polyethylene |
|  | PP: | polypropylene. |

2. A conductive polymer blend according to claim 1, wherein said conductive material is a carbon product.

3. A conductive polymer blend according to claim 2, wherein said carbon product is a carbon black.

4. A conductive polymer blend according to claim 1, wherein said conductive material is at least one member selected from steel fibers, metal powders or flakes, organic semiconductor powders, metal-coated fibers, conductive metal oxide particles, or inorganic particles coated with a conductive layer.

5. A conductive polymer blend according to claim 4, wherein said conductive material is a powder of particles of TiO$_2$ covered with a layer of Sb$_2$O$_5$-doped SnO$_2$.

6. A conductive polymer blend according to claim 5, wherein said particles of TiO$_2$ covered with a layer of 5b$_2$O$_5$ doped SnO$_2$ are acicular.

7. A conductive polymer blend according to claim 4, wherein said conductive material has a particle size not greater than about 20 μm.

8. A conductive polymer blend according to claim 1, wherein said conductive polymer forms a product which retains at least about 65% of the tensile strength at break of the polymer in the blend which has the highest tensile strength at break, as compared to the other polymers in the blend, if each polymer were used as a single-phase polymer system and formed into a product under the same conditions.

9. A conductive polymer blend according to claim 1, wherein said conductive polymer forms a product which retains at least about 60% of the resilience of the polymer in the blend which has the highest resilience, as compared to the other polymers in the blend, if each polymer were used as a single-phase polymer system and formed into a product under the same conditions.

10. A conductive polymer blend according to claim 1, wherein said conductive polymer forms a product which retains at least about 65% of the tensile modulus of the polymer in the blend which has the highest tensile modulus, as compared to the other polymers in the blend, if each polymer were used as a single-phase polymer system and formed into a product under the same conditions.

11. A conductive polymer blend according to claim 1, wherein said conductive polymer forms a product which retains at least about 65% of the elongation at break of the polymer in the blend which has the highest elongation at break, as compared to the other polymers in the blend, if each polymer were used as a single-phase polymer system and formed into a product under the same conditions.

12. A conductive polymer blend comprising:
   (a) at least two polymers which are at least partially immiscible with each other, and are present in proportions such that each polymer forms a respective continuous phase and the two respective continuous polymer phases are co-continuous with each other in the polymer blend;
   (b) at least one conductive material in particulate or fiber form which is substantially localized in one of said co-continuous polymer phases or substantially localized at a continuous interface between said co-continuous polymer phases; and
   (c) at least one mineral filler.

13. A conductive polymer blend according to claim 12, wherein said mineral filler is selected from inorganic carbonates, silicates, aluminosilicates, oxides, hydroxides, sulfates, or sulfides.

14. A conductive polymer blend according to claim 12, wherein said mineral filler is calcium carbonate, talc, or precipitated silica.

15. A conductive polymer blend according to claim 12, wherein said mineral filler has a particle size not greater than about 50 μm.

16. A conductive polymer blend according to claim 12, wherein said conductive polymer forms a product which retains at least about 65% of the tensile strength at break of the polymer in the blend which has the highest tensile strength at break, as compared to the other polymers in the blend, if each polymer were used as a single-phase polymer system and formed into a product under the same conditions.

17. A conductive polymer blend according to claim 12, wherein said conductive polymer forms a product which retains at least about 60% of the resilience of the polymer in the blend which has the higher resilience, as compared to the other polymers in the blend, if each polymer were used as a single-phase polymer system and formed into a product under the same conditions.

18. A conductive polymer blend according to claim 12, wherein said conductive polymer forms a product which retains at least about 65% of the tensile modulus of the polymer in the blend which has the highest tensile modulus, as compared to the other polymers in the blend, if each polymer were used as a single-phase polymer system and formed into a product under the same conditions.

19. A conductive polymer blend according to claim 12, wherein said conductive polymer forms a product which retains at least about 65% of the elongation at break of the polymer in the blend which has the highest elongation at break, as compared to the other polymers in the blend, if each polymer were used as a single-phase polymer system and formed into a product under the same conditions.

20. A conductive polymer blend according to claim 12, wherein said at least two polymers are a pair selected from the following pairs of polymers:
HDPE/TPU
HDPE/EPR
HDPE/EPDM
HDPE/mLLDPE
PP/EPDM
PP/EPR
PP/mLLDPE
mLLDPE/EPR,

| wherein | HDPE: | high density polyethylene |
|---|---|---|
| | TPU: | thermoplastic urethane |
| | EPR: | ethylene propylene rubber |
| | EPDM: | ethylene propylene diene rubber |
| | mLLDPE: | metallocene catalyzed linear low density polyethylene |
| | PP: | polypropylene. |

21. A conductive polymer blend comprising:
(a) at least two polymers which are at least partially immiscible with each other, and are present in proportions such that each polymer forms a respective continuous phase and the two respective continuous polymer phases are co-continuous with each other in the polymer blend;

(b) at least one conductive material in particulate or fiber form which is substantially localized in one of said co-continuous polymer phases or substantially localized at a continuous interface between said co-continuous polymer phases; and (c) at least one thixotropic thickening agent.

22. A conductive polymer blend according to claim 21, wherein the thixotropic thickening agent is fumed silica.

23. A method for preparing a conductive polymer blend, comprising the steps of blending:
(a) at least two polymers which are at least partially immiscible with each other, and are present in proportions such that each polymer forms a respective continuous phase and the two respective continuous polymer phases are co-continuous with each other in the polymer blend; and (b) at least one conductive material in particulate or fiber form which is substantially localized in one of said co-continuous polymer phases or substantially localized at a continuous interface between said co-continuous polymer phases, wherein said at least two polymers are a pair selected from the following pairs of polymers:
HDPE/TPU
HDPE/EPR
HDPE/EPDM
HDPE/mLLDPE
PP/EPDM
PP/EPR
PP/mLLDPE
mLLDPE/EPR,

| wherein | HDPE: | high density polyethylene |
|---|---|---|
| | TPU: | thermoplastic urethane |
| | EPR: | ethylene propylene rubber |
| | EPDM: | ethylene propylene diene rubber |
| | mLLDPE: | metallocene catalyzed linear low density polyethylene |
| | PP | polypropylene. |

24. An article formed from a conductive polymer blend of claim 1.

25. An article formed from a conductive polymer blend of claim 12.

26. An article formed from a conductive polymer blend of claim 21.

27. An article according to claim 26, which is formed by blow molding.

* * * * *